US005318871A

United States Patent [19]

Inagaki et al.

[11] Patent Number: 5,318,871

[45] Date of Patent: Jun. 7, 1994

[54] TONER FOR ELECTROPHOTOGRAPHY AND METHOD FOR PRODUCING THE SAME

[75] Inventors: Sanji Inagaki, Toyokawa; Shoichi Tsuge, Okazaki; Mineyuki Sako, Toyohashi; Kenzo Toya, Okazaki; Yasuhiro Terunuma, Ibaragi; Yukako Oya, Ibaragi; Michio Ohmori, Ibaragi, all of Japan

[73] Assignees: Minolta Camera Kabushiki Kaisha, Osaka; Mitsubishi Petrochemical Co., Ltd., Tokyo, both of Japan

[21] Appl. No.: 868,239

[22] Filed: Apr. 14, 1992

[30] Foreign Application Priority Data

Apr. 16, 1991 [JP] Japan .................................. 3-083801
Apr. 2, 1992 [JP] Japan .................................. 4-080693

[51] Int. Cl.$^5$ ......................... G03G 9/08; C08L 67/02

[52] U.S. Cl. .................................... 430/106; 430/108; 430/109; 430/110; 430/111; 430/138; 525/63; 525/64; 525/68; 525/176; 525/177; 525/445

[58] Field of Search ............... 430/106, 108, 109, 138, 430/110, 111; 524/504, 513; 525/63, 64, 68, 176, 177, 445

[56] References Cited

U.S. PATENT DOCUMENTS 3,974,078 8/1976 Crystal ................................ 430/109
4,713,310 12/1987 Horie .................................. 430/109
4,837,138 6/1989 Horie .................................. 430/106

FOREIGN PATENT DOCUMENTS 0066395 12/1982 European Pat. Off. .
0099140 1/1984 European Pat. Off. .
62-17753 1/1987 Japan .
2003885 3/1979 United Kingdom .

OTHER PUBLICATIONS

Patent Abstracts of Japan, vol. 10, No. 354, (P-521) Nov. 28, 1986 & JP-A-61 153 660 (Toshiba Corp.) Jul. 12, 1986 abstract.

World Patents Index, Week 7329, Derwent Publications Ltd., London, GB; AN 73-41017U & BE-A-793 248 (Xerox Corp.) abstract.

*Primary Examiner*—John Kight, III
*Assistant Examiner*—Shelly A. Dodson
*Attorney, Agent, or Firm*—Burns, Doane, Swecker & Mathis

[57] ABSTRACT

A toner for electrophotography obtained by melting and kneading a kneaded material prepared by melting and kneading a domain resin and a coloring agent, a matrix resin having a low compatibility with the domain resin, and a dispersion assistant having a compatibility with both of the domain resin and matrix resin and a Izod impact value higher than the matrix resin to obtain a colored composition, followed by pulverizing and classifying the colored composition.

17 Claims, 1 Drawing Sheet

TONER FOR ELECTROPHOTOGRAPHY AND METHOD FOR PRODUCING THE SAME

BACKGROUND OF THE INVENTION

The present invention relates to a toner for electrophotography, in particular, which is composed of domain resin containing a coloring agent and being dispersed in a matrix resin, and a method for producing the same.

As a toner for electrophotography, there have been generally used the ones which are prepared by the steps of melting and kneading a matrix resin as a binder, a coloring agent and the like, pulverizing the kneaded material, and classifying the pulverized material to have a uniform specified particle size distribution.

Coloring agents are, however, irregularly exposed on the surface of such a toner obtained by the method of pulverizing as noted above. Since the coloring agent is inferior in moisture resistance and environmental resistance, there arise some problems in uniformity in electrification amount on each toner particle and so does in stability against storage and environment. Moreover, the coloring agent may be separated from toner surface to adhere to carrier surface, causing instability of electrification ability.

To prevent adverse effects caused by exposure of the coloring agent onto the toner surface, a micro-dispersion technique has been proposed in which the coloring agent is put into a specified phase in the toner (for example, Japanese Patent Laid-Open Publication SHO 62-17753). While the coloring agent may be suppressed from being exposed until the kneading step in the micro-dispersion technique, the problem of exposure of the coloring agent on the surface remains unsolved after pulverizing.

Further, in the method for producing a toner by pulverizing a kneaded material, a toner is liable to be over-pulverized. The resulting particle size distribution is considerably large in width. The classification yield of the toner having a specific particle size range is quite low. In particular for enhancing the image quality of electrophotographical copy images, there have been demanded a toner having a small particle size and a narrow particle size distribution, whereas conventional toners are more likely to result in an over-pulverization and moreover in a markedly low yield after classification, disadvantageously.

As a method for producing a toner having a uniform particle size distribution efficiently with the coloring agent kept from being exposed on the surface, it is possible to apply a suspension polymerization method in which the toner particles are formed in a solution, or a spray-dry method. However, the resulting particles in these methods are so high in the degree of sphericality as to result in a problem of residual toner in a conventional general-purpose cleaning method, or the blade-cleaning method. To avoid this problem, it is necessary to adopt a complex cleaning method. Moreover, since the method for producing a toner by the suspension polymerization method or the like is a new method, there is another problem that conventional facilities for the kneading and pulverizing method can not be used, necessitating additional investment.

SUMMARY OF THE INVENTION

The object of the present invention is to provide an irregular toner for electrophotography in which the exposure of coloring agent on the surface is suppressed and which is excellent in electrification characteristics, electrification stability (moisture resistance, durability with respect to copy, resistance against circumstances and stability during the storage) and distinctness of copy images.

Another object of this invention is to provide a method for producing a toner effectively with small amount of scattered particles during a pulverizing process.

The present invention relates to a toner for electrophotography comprising at least;

a domain resin composition, a matrix resin composition and a dispersion assistant in a specified relationship.

The present invention also relates to a production method of the above toner.

DETAILED DESCRIPTION OF THE INVENTION

The present invention provides to a toner for electrophotography excellent in electrification characteristics, electrification stability (moisture resistance, durability with respect to copy, resistance against circumstances and stability during the storage) and distinctness of copy images.

The present invention has accomplished the above objects by form a toner with at least;

a domain resin composition containing a coloring agent;

a matrix resin composition having a low compatibility with the domain resin; and a dispersion assistant having a compatibility with both the domain resin and the matrix resin and having an Izod impact value higher than that of the matrix resin, the domain resin composition being dispersed in the matrix resin with the dispersion assistant interposed.

Figure 1:
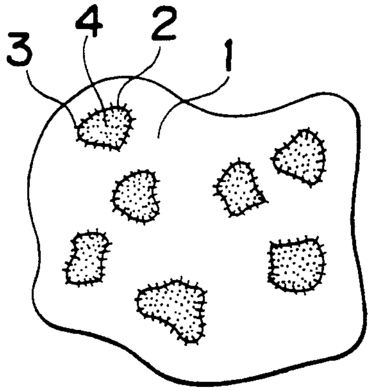
FIG. 1 is a schematic cross sectional view of a toner particle according to the present invention.

The constitution of a toner for electrophotography according to this invention can be recognized as shown schematically in FIG. 1. The toner according to this invention is composed of a matrix resin (1), a domain resin dispersed in the matrix resin phase (2), a coloring agent existing in the domain resin phase (4) and a dispersion assistant (3) existing between the domain resin phase and matrix resin phase. At least a part of the domain resin phase is covered with the dispersion assistant phase. A resin having a predetermined difference in impact resistivity is used for the dispersion assistant and matrix resin, by which the domain resin is effectively protected from being broken in the pulverizing process for producing the toner. As a result, since the coloring agent (4) is sealed up in the domain resin and not exposed on the surface, the electrification stability is achieved. Moreover, the existence of the dispersion assistant like this prevents over-pulverizing, thereby resulting in a fairly good production efficiency.

Examples of the matrix resins of the toner for electrophotography are homopolymers or copolymers of α-olefin such as ethylene, propylene, butene-1, pentene-1,4-methyl pentene-1 and hexene-1; block, random or graft copolymers of these α-olefin with other unsaturated compounds, wherein more than half weight of the polymer is composed of the former compounds; modified homo- or copolymers in which the above homo- or copolymers are subjected to halogenation, sulfonation or oxidation; acrylonitrile-styrene copolymers (AS resin); polycarbonates, thermoplastic polyesters, polyamides, polystyrenes, styrene.butadiene.styrene block copolymers, polyacrylonitriles, thermoplastic polymers like methyl polymethacrylates, and rubbers.

Other unsaturated compounds which can be copolymerized with α-olefin in the olefin polymers described above are, for example, vinyl esters like vinyl acetate, vinyl silanes such as vinyl methoxysilane and vinyl triacetoxysilane and ethylenic unsaturated monomers other than the α-olefin given by the examples described above.

Polyesters and polystyrenes, which are thermoplastic polymers to be used in this invention, are preferable as a matrix phase.

Polyesters which are preferably used in this invention are appropriately selected from the widely used polymers obtained by condensation polymerization of polybasic acids and polyfunctional alcohols.

Examples of polybasic acids are aromatic carboxylic acids such as terephthalic acid, isophthalic acid and trimellitic acid, aliphatic carboxylic acid such as adipic acid, hexahydroterephthalic acid, succinic acid, n-dodecenyl succinic acid, iso-dodecenyl succinic acid, n-dodecyl succinic acid, n-octyl succinic acid, iso-octyl succinic acid and n-butyl succinic acid, and unsaturated carboxylic acids such as maleic acid and fumaric acid, and their acid anhydrides. Polyfunctional alcohol components are ethylene glycol, propyleneglycol, 1,4-butanediol, hexamethylene glycol, neopentyl glycol, 2,2,4,4-tetramethylene glycol, glycerine, trimethylolpropane, bisphenol A, hydrogenated bisphenol A, sorbitol or their etherified hydroxyl compounds such as polyoxyethylene(10)sorbitol, polyoxypropylene(5)-glycerine, polyoxyethylene(4)-pentaerythritol, polyoxypropylene(2,2)-2,2-bis(4-hydroxyphenyl)propane and polyoxyethylene(2)-2,2-bis(4-hydroxyphenyl)propane.

Polyesters by which the effect of this invention is most predominant are those soluble in solvents. Non-crystalline or low crystalline polymers, especially those having a crystallinity of less than 5% as measured by X-ray analysis have a large effect. Polymers having a softening point of 40° to 150° C., especially from 60° to 150° C., and a number average molecular weight of 500 to 40000, especially from 1000 to 30000, have a large effect.

Polystyrenes which are preferably used in this invention are thermoplastic resins of polystyrenes. The polystyrenes may be a homopolymer of styrene, methylstyrene, dimethylstyrene, ethylstyrene, isopropylstyrene, chlorostyrene, α-methylstyrene or α-ethylstyrene, or a copolymer thereof with other polymerizable monomers. Such other polymerizable monomers are unsaturated carboxylic acids or the derivatives thereof which are exemplified by unsaturated carboxylic acid such as acrylic acid, methacrylic acid, maleic acid and itaconic acid, unsaturated carboxylates such as methyl acrylate, ethyl acrylate, 2-ethylhexyl methacrylate, butyl acrylate, methyl acrylate, methyl methacrylate, ethyl methacryrate, n-butyl methacrylate, dibutyl fumarate and dioctyl fumarate, unsaturated anhydrides such as maleic anhydride and itaconic anhydride, acid derivatives such as acrylonitrile, and derivatives thereof. Among these polystyrenes, a copolymer composed of 50 percents by weight or more of styrenes and 50 percents by weight or less of unsaturated carboxylic monomers or derivatives thereof is preferable because a pulverizing process can be more effectively carried out. Such a copolymer may be a terpolymer as well as binary polymer. In the case of ternary polymer, a polymerizable monomer such as ethylene, propylene, hexene, polyenes such as butadiene and isopropene, vinyl esters such as vinyl acetates, vinyl silanes such as vinyltrimethoxysilane and vinyltriethoxysilane are used in addition to the styrenes and the unsaturated carboxylic acids or the derivatives thereof. Among them, polymers having a glass transition temperature of 30° to 105° C. and a number average molecular weight of 1000 to 150000, especially from 2000 to 100000, have a large effect.

Solvent soluble polymers are preferable as polystyrenes to be used in this invention.

Since these matrix resins may exist in an amount sufficient for coating the dispersed domain resin, they can be used in a wide range relative to the toner. Therefore, it is usually preferable to use the resin in an amount of 10 to 99 percents by weight relative to the toner resin, and the amount of 30 to 95 percents by weight is more preferable. When the amount is less than the range described above, the matrix resin phase and domain resin phase are inverted with each other and the resins containing the coloring agent are exposed on the pulverized surface, thereby causing deficiencies in electrification and decreasing production efficiency by a broad particle size distribution because the toner is over-pulverized. When the amount is larger than the range described above, it causes a mal-dispersion of the coloring agent in the matrix resin.

Resins similar to the matrix resins described above can be applied to the domain resins. It is not always necessary that the domain resin is the same kind resin as that of the matrix resin. When polystyrenes are used as the matrix resin, polystyrenes which is the same kind resin as that used as the matrix resin may be used or polyesters which are different kind resin from that used as the matrix resin may be used. It is, however, necessary, that the resins the compatibility of which are modified by changing co-monomers to be copolymerized and which are made not to mix homogeneously with each other are used. Thereby, the domain resin is dispersed in the matrix resin. When the polyesters are used as the domain resin, the ones having number-average molecular weight of 500–30000, preferably 5000–30000 have a large effect.

The coloring agent is dispersed and retained in the domain resin in the toner for electrophotography according to this invention, and this domain resin is dispersed in the matrix resin. The coloring agent is prevented from exposing on the toner surface and an effect to make electrification ability on the toner surface uniform is attained by dispersing and retaining the coloring agent in the domain resin. Bleeding of colors is also prevented when the domain resin in which the coloring agent is dispersed and retained is dispersed uniformly in the matrix resin.

In other words, the matrix resin and domain resin in the toner composition according to this invention are the resins which do not mix homogeneously with each other, and the resin having better compatibility with the coloring agent to be used works as a domain resin.

The dispersion assistant to be used for the toner for electrophotography according to this invention is composed of a copolymer comprising the domain resin component and matrix resin component. The polymer obtained by graft-copolymerization of a monomer composing the domain resin or matrix resin with a monomer composing the other resin is preferable.

In more detail, for example, when the matrix resin is composed of polystryrenes and the domain resin is composed of polyesters, it is preferable that the dispersion assistant is composed of a modified polyester obtained by modifying chemically a thermoplastic polyester by use of styrenes or a mixture of styrenes with unsaturated carboxylic acids or derivatives thereof.

The dispersion assistant to be used in this invention works to disperse the domain resin finely in the matrix resin, and the amount of 1 percents by weight at most in the toner composition is sufficient to make the dispersed phase fine and homogeneous. Use of more than 3 percents by weight is preferable.

The dispersion assistant having an Izod impact value of 0.1 kgf.cm/cm higher or more, preferably 0.2 kgf.cm/cm higher or more and more preferably 0.4 kgf.cm/cm higher or more than that of the matrix resin is used. The composite is preferentially broken at the matrix phase during the pulverizing process by using the resin described above, thereby preventing the domain resin from being broken. Thus, because the coloring agent remains to be sealed up in the domain resin phase, mal-effects arising from the coloring agent exposed on the toner surface can be prevented. When Izod impact value is less than the above-described range, the domain resin tends to suffer from a stress and the resin is liable to be broken easily. Destruction of the domain resin causes a mal-effect due to an exposure of the coloring agent, and the production efficiency is largely reduced since the resin tends to be over-pulverized and the particle size distribution is made wide.

When there is nothing in common between the monomers constituting the matrix resin and the monomers constituting the domain resin, for example, the matrix resin is composed of polystyrenes and the domain resin is composed of polyesters, it is effective that each Izod impact values among the dispersion assistant, the domain resin and the matrix resin has the relationship below: (dispersion assistant)$\geqq$(domain resin)$>$(matrix resin). Thereby, the domain resin phase is prevented from destruction effectively and it becomes easier to prepare fine toner particles at high efficiency.

In this case, the difference of Izod impact value between the dispersion assistant and the matrix resin is adjusted as described above. An Izod impact value of the domain resin is adjusted to the same value as that of dispersion assistant or to a value between dispersion assistant and the matrix resin. It is desirable that an Izod impact value of the dispersion assistant is 0.1 kgf.cm/cm higher or more, preferably 0.2 kgf.cm/cm higher or more than that of domain resin and further 0.2 kgf.cm/cm higher or more, preferably 0.4 kgf.cm/cm higher or more than matrix resin.

Izod impact value in this invention is expressed by the value as measured by using Mini-max Izod testing machine (Model CS-183; made by Instrument Co.). A test piece of $30\times12\times2.0$ (mm) was prepared by a press molding (molding condition; 130° C., 60 to 70 kg/cm$^2$), and this test piece was subjected to a test by the testing machine described above.

Methods for graft reaction of polystyrenes with vinyl monomers are exemplified by (1) a method of adding a vinyl monomer in a solvent in which a polymer is dissolved and allowing to react, (2) a method for allowing to react by dissolving a polymer in a vinyl monomer, (3) a method of suspending polymer particles in water and adding a vinyl monomers to the suspended solution to be incorporated in the polymer particles, followed by allowing to react, (4) a method for allowing to react in a condition in which a solution of a polymer in a vinyl monomer is dispersed in water as droplets, (5) a method for allowing to react a melted polymer with a vinyl monomer or (6) a graft polymerization method by irradiation. Among the methods, methods (3) and (4) are preferable. The matrix resin and domain resin are simultaneously formed and involved in the polymers obtained by methods (3) or (4), and the polymer is available for use without adding the matrix resin or domain resin independently. The method above mentioned can be applied to modification of polyesters.

Polymerization initiators are usually added in these reaction above mentioned. While polymerization initiators generally used for radical polymerization can be also used, it is preferable to select initiators from those having their decomposition temperature of 45° to 110° C., especially from 50° to 105° C., by taking the polymerization temperature into account. The decomposition temperature mentioned here means such a temperature that the decomposition ratio of the radical generating agent becomes equal to 50% after 0.1 mole of the polymerization initiator is added in 1 litter of benzene to be allowed to stand for 10 hours.

Examples of such initiators are organic peroxides such as 2,4-dichlorobenzoylperoxide (54° C.) (where the temperature in the parenthesis indicates a decomposition temperature), tert-butyl-peroxypivalate (56° C.), o-methylbenzoylperoxide (57° C.), bis-3,5,5-trimethylhexanoylperoxide (60° C.), octanoylperoxide (61° C.), lauroylperoxide (62° C.), benzoylperoxide (74° C.), tert-butylperoxy-2-ethyl hexanoate (74° C.), 1,1-bis(tert-butylperoxy)-3,5,5-trimethylcyclohexane (91° C.), cyclohexanone peroxide (97° C.), 2.5-dimethyl-2,5-dibenzoylperoxyhexane (100° C.), tert-butylperoxybenzoate (104° C.), di-tert-butyl-diperoxyphthalate (105° C.), methylethylketone peroxide (109° C.), dicumylperoxide (117° C.) and dicumyl-tert-butylperoxide. These compounds can be also used together with each other.

The amount of the polymerization initiators to be used is in the range from 0.05 to 30 percents by weight, preferably from 1 to 10 percents by weight relative to vinyl monomers.

The dispersion assistant can be also obtained by "in situ" graft polymerization of the monomers which are able to give the matrix resins (polyester, for example) and domain resins (polystyrenes, for example) in this invention.

When the matrix resin is composed of polystyrenes and the domain resin is composed of polyesters, it is preferable from the view point of pulverization of toner that dispersion assistant is composed of a modified polyester obtained by modifying chemically a thermoplastic polyester having number-average molecular weight equal to or more than that of the polyester of domain resin by use of monomers which constitute the matrix resin. In this case, it is preferable that polyesters are modified so that a content of the monomers constituting the matrix may be within the range of 5–80 percents by weight. If the content is less than 5 percents by weight, sufficient effects can not be given by dispersion assistant as graft polymer. If the content is more than 80 percents by weight, polymer properties of matrix resin are so remarkable that the effects of dispersion assistant and the impact resistance can not be obtained.

The coloring agents to be used for the toner for electrophotography in this invention are exemplified by carbon black, basic dyes like Rhodamine B, acidic dyes, fluorescent dyes, azo dyes, anthraquinone dyes, azine dyes, Nigrosine dyes and metal complex dyes, in addition to rouge, titanium oxide, Cadmium Yellow, Cadmium Red, basic dye lake and phthalocyanine dyes. The amount of addition of these coloring agents is usually in the range of 0.05 to 50 percents by weight, preferably in the range is from 0.1 to 20 percents by weight.

Coloring agents having a larger affinity to domain resins than that to matrix resin are used because substantially all the amount of the coloring agent is required to be dispersed and filled in the domain resin.

Olefin polymers of low molecular weight, colloidal silica, fatty acids or metal salts of fatty acids may be further added to toner according to this invention for the purpose of improving its fluidity and parting ability.

A kneaded material which is prepared by melting and kneading domain resin and coloring agent in a definite amount described above is first obtained in the production process of the toner according to this invention. Kneading can be usually carried out by using a conventional roller, kneader or extruder.

A colored composite is then obtained by melting and kneading the kneaded material prepared, the matrix resin and dispersion assistant in a definite amount described above.

The domain resin containing the coloring agent is finely and homogeneously dispersed in the matrix resin in the colored composition. Such a homogeneous dispersion system can be formed by an appropriate selection of the characteristics of the composition components (molecular weight, molecular weight distribution, copolymerization ratio, randomness, electric characteristics, compatibility and affinity) and mixing conditions (apparatus, temperature, kneading rate and time).

In general, the preferable size of the dispersed phase of the domain resin in the matrix resin is 5 μm or less, preferably 2 μm or less. When the smaller toner is desired, the smaller size of domain resin phase is preferable. If the size is larger than 5 μm, the exposure of domain resin on toner surface causes adverse influences. The particle size mentioned here is the primary mean particle size (Martin's diameter) on the cross section of a sample as observed by an electron microscope.

Finally, the matrix colored composition in which the domain resin phase containing coloring agents is dispersed is pulverized and classified. Particles the surface of which is substantially covered with the matrix resin can be obtained according to this invention because the resin is pulverized while the stress is concentrated on the matrix resin. Moreover, particle size distribution of the pulverized material becomes sharp and a high classification efficiency is achieved. Exposure of the coloring agent is suppressed to improve electrification stability of toner.

Figure 2:
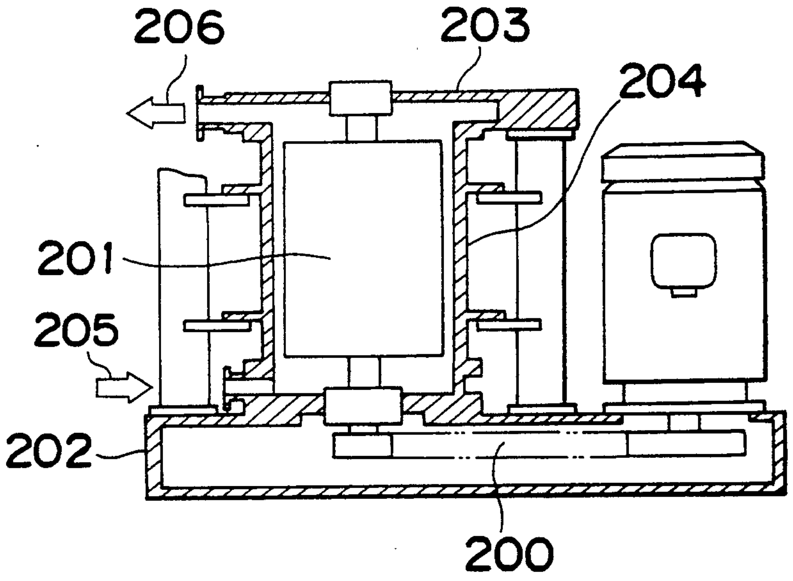
FIG. 2 is a schematic cross sectional view of a low impact type pulverizing machine (Cryptron pulverizing machine).

Pulverizing can be carried out by means of a jet mill, hammer mill or pin mill. It is preferable to use a low-impact pulverizing method like a Cryptron crusher (made by Kawasaki Heavy Industries, Ltd. FIG. 2) to impart a pulverizing stress effectively to the matrix resin phase and improve the classification yield. The Cryptron crusher (FIG. 2) is a vertically installed crusher of a high speed rotation type which is composed of a rotor (201) driven by a V-shaped belt (200), an inlet casing (202), an outlet casing (203) and a stator (204) attached with a liner having a lot of slots on the surface. The raw material sucked into the inlet (205) together with the air is at first dispersed uniformly along the outer periphery by the rotor rotating at a high speed, and then is instantaneously pulverized by being drawn into a vigorous whirlpool generated between a special-shaped rotor blade and liner blade, and the pulverized material is discharged from the exhaust port (206) outside.

Fine particles the surface of which is covered with the matrix resin (exposure of the coloring agent is not observed at all or slightly observed) can be produced in high classifying efficiency by the method described above.

Toner particle size is generally adjusted to 5–20 μm in mean particle size. In this invention, fine toner having mean particle size of less than 10 μm can be produced at high efficiency. Such fine toner is useful in formation of copy images excellent in distinction.

It is, of course, also possible to control various characteristics by adding other additives such as charge controlling agents and fluidization agents appropriately in the matrix resin or domain resin although the main object of this invention is to improve classification yield and stabilization of electrification by preventing coloring agents from being exposed from the view point of the destructive property. These embodiments are also included in this invention.

Although this invention is described in detail referring to the examples, it is not intended that the scope of this invention is not limited by the examples referred hereinafter.

The domain resins, matrix resins and dispersion assistants used in the examples are shown below.

Domain Resins

Styrene.acrylic acid ester copolymer
Molecular weight: 53000
Izod impact strength: 0.51 (kgf.cm/cm)

Matrix Resin styrene.maleic anhydride copolymer
Molecular weight: 10000
Izod impact strength: 0.17 (kgf.cm/cm)

Dispersion Assistant

Reformed styrene polymer
Izod impact strength: 0.41 (kgf.cm/cm)

REFERENCE EXAMPLE 1 (Production of the Dispersion Assistant Resin)

An aqueous medium was prepared in an autoclave of net volume of 10 litters by adding 4 kg of water, 80 g of tricalcium phosphate and 0.122 g of sodium dodecylbenzene sulfonate, and a solution prepared by dissolving 8 g of "NYPER B" in a mixed solution of 640 g of styrene and 160 g of n-butyl acrylate was added to the aqueous medium followed by stirring. After placing 1200 g of above-described matrix resin (styrene copolymer) particles into the solution and replacing the interior of the autoclave with nitrogen, the temperature inside the reaction system was raised to 60° C. and, while keeping the temperature for 3 hours, the matrix resin particles were integrated with styrene containing the polymerization initiator described above.

Then, 11.4 g of "PERBUTYL PV" was placed into this suspension and, after raising the system temperature to 65° C. and keeping the temperature for 2 hours, polymerization of the surface of styrene polymer particles was allowed to start. Polymerization was completed by raising the temperature of the reaction system to 90° C. and keeping the temperature for 3 hours.

After cooling, the substance in the reaction system was taken out and was subjected to washing with acid and water, thereby giving 2 kg of the dispersion assistant resin.

EXAMPLE 1

Forty parts by weight of the domain resin and 5 parts by weight of carbon black were melted and kneaded by a two-axis kneading and extruding machine.

A colored composition was obtained by melting and kneading 45 parts by weight of this kneaded material, 55 parts by weight of the matrix resin and 8 parts by weight of the dispersion assistant by using a two-axis kneading and extruding machine.

A portion of this colored composition was placed between a piece of slide glass and cover glass and a thin film was formed by heating and melting on a hot plate, and the sample was investigated by a transmission type optical microscope. An existence of a colored dispersion phase was observed and its particles size was found to be 0.5 to 1.0 μm, which indicated that the dispersed phase was finely and uniformly distributed in the matrix. Any coloring agent was not observed in the matrix.

The colored material was finely pulverized by a jet mill and classified to give a toner with a mean particle size of 8 μm. The yield of classification was 75%.

COMPARATIVE EXAMPLE 1

A colored composition was obtained by the same method as described in Example 1, except that the dispersion assistant used in Example 1 was eliminated in this example. When the composition was evaluated by a similar method in Example 1, the particle size was 1.0 to 3.0 μm and its dispersion was non-uniform although an existence of the dispersed phase was observed. The dispersion phase as well as matrix phase was filled with the coloring agent.

The material was subjected to fine pulverizing and classifying as carried out in Example 1, resulting in a classification yield of 53%.

COMPARATIVE EXAMPLE 2

A colored and kneaded composition was obtained by melting and kneading 40 parts by weight of the domain resin, 55 parts by weight of the matrix resin and 5 parts by weight of carbon black by using a two-axis kneading and extruding machine.

An evaluation of the obtained composition carried out in a manner similar to Example 1 revealed that the coloring agent distributed almost uniformly throughout the composition and any dispersed phase was scarcely observed. The classification yield was as low as 25% and the particle size distribution was also broad.

Izod impact strength of this composition was 0.22 (kgf.cm/cm), which was a value close to that of the matrix resin.

COMPARATIVE EXAMPLE 3

A colored composition was obtained by the same method as in Example 1, except that the domain resin and matrix resin used in Example 1 were exchanged with each other, i.e. styrene.maleic anhydride copolymer was used as a domain resin and styrene.acrylic acid ester copolymer was used as a matrix resin, and carbon black which was subjected to a surface treatment so that it could have an affinity with styrene.maleic anhydride copolymer as a domain resin was used.

The composition was evaluated as in Example 1, The dispersed phase was finely and uniformly distributed as in the case of Example 1 and any coloring agent was not observed in the matrix.

When this composition was subjected to a fine pulverizing as in Example 1. A long time, however, was taken for pulverization and the classification yield was as low as 44%.

EXAMPLE 2

A colored composition was obtained by the same method as used in Comparative Example 3, except that a dispersion assistant was used whose Izod impact strength was made to 0.6 (kgf.cm/cm) by increasing the degree of polymerization of the dispersion assistant used in Comparative Example 3.

The obtained composition was evaluated as in Example 1. The dispersed phase was finely and uniformly distributed as in the case of Comparative Example 1 and any coloring agent was not observed in the matrix.

When this composition was subjected to a fine pulverizing and classifying as in Example 1, the classification yield was good to show a value of 70% although a longer time was taken for pulverization than that in Comparative Example 3.

COMPARATIVE EXAMPLE 4

A colored composition was obtained by the same method as used in Comparative Example 3, except that a dispersion assistant was used whose Izod impact strength was made to 0.29 (kgf.cm/cm) by decreasing the degree of polymerization of the dispersion assistant used in Comparative Example 3.

The obtained composition was evaluated as in Example 1. An existence of the dispersed phase was observed. Particle size showed, however, a slightly non-uniform value of 0.8 to 2.7 μm and some coloring agent was found in the matrix phase also.

When the colored composition was subjected to a fine pulverizing and classifying as in Example 1, the time necessary for pulverizing was an intermediate value of those in Example 1 and Comparative Example 2. The classification yield of this pulverized composition was as low as 34%.

EXAMPLE 3

A colored composition was obtained by the same method as used in Example 1, except that 60 parts by weight of a kneaded material obtained by melting and kneading of 40 parts by weight of the domain resin and 20 parts by weight of carbon black by a two-axis kneading and extruding machine was used.

When this composition was evaluated by the same method described above, an identical dispersion state with that in Example 1 was observed. Classification yield was 76% which was a similar value to that obtained in Example 1.

COMPARATIVE EXAMPLE 5

A colored composition was obtained by the same method as used in Comparative Example 2, except that the amount of carbon black used in Comparative Example 2 was changed to 18.5 parts by weight.

When this composition was evaluated by the same method as in Example 1, the coloring agent was distributed over the entire system as in the case of Comparative Example 2 and any dispersed phase was not observed at all. The yield of classification was 23% and particle size distribution was broad.

EXAMPLE 4

A kneaded material was obtained by exchanging the matrix resin and domain resin in Example 1 with each other, i.e. styrene.maleic anhydride copolymer was used as a domain resin and styrene.acrylic acid ester copolymer was used as a matrix resin, and by melting and kneading 40 parts by weight of the domain resin and 20 parts by weight of carbon black by a two-axis kneading and extruding machine.

A colored composition was obtained by subjecting 60 parts by weight of this kneaded material, 55 parts by weight of the matrix resin and 8 parts by weight of the dispersion assistant, in which the degree of polymerization was increased so that the impact value is made to 0.6 (kgf.cm/cm), to melting and kneading by a two-axis extruder.

When this composition was evaluated by the same method as used in Example 1, an existence of dispersed phase was observed with its particle size of 0.6 to 1.0 μm and this dispersed phase was finely and uniformly distributed over the matrix resin. Any coloring agent was not observed in the matrix resin at all.

When the colored composition was subjected to fine pulverizing and classifying by the same method as used in Example 1. A long time was taken for classification but the classification yield was as good as 72%.

COMPARATIVE EXAMPLE 6

A colored composition was obtained by the same method as used in Example 4, except that a dispersion assistant having a impact value of 0.29 (kgf.cm/cm) was used instead of that used in Example 4.

When this composition was evaluated by the same method as used in Example 1, an existence of the dispersed phase was observed with a particle size of 1.0 to 2.9 μm, showing a slightly non-uniform dispersion. A few of the coloring agent was found in the matrix resin.

After subjecting the colored composition to fine pulverizing and classifying, a classification yield of 30% was obtained.

Electric resistance and electrification amount were measured with respect to the toners obtained in Examples 1 to 4 and Comparative Examples 1 to 6.

Electric resistance was measured by an impedance bridge method.

The electrification amount of the toner was measured by using a blow-off electrostatic charge measuring apparatus after each developer was allowed to stand for 12 hours under a high temperature and high humidity of 30° C. and 85%, and also after allowed to stand for 1 month at 45° C. The results are listed in Table 1.

TABLE 1

| | electrical resistance (Ω/cm) | electrification properties: initial electrifications amount | 30–85% standing for 12 hr | 45° C. standing for one month |
|---|---|---|---|---|
| Example 1 | $10^{15}$ or more | −24 μc/g | −24 μc/g | −23 μc/g |
| Com. Exam. 1 | $10^{14}$ | −17 | −11 | −10 |
| Com.. Exam. 2 | $10^{15}$ or more | −13 | −8 | −5 |
| Com. Exam. 3 | $10^{14-15}$ | +11 | +6 | +6 |
| Example 2 | $10^{15}$ or more | +13 | +12 | +11 |
| Com. Exam. 4 | $10^{14}$ | +9 | +5 | +3 |
| Example 3 | $10^{15}$ or more | −22 | −21 | −22 |
| Com. Exam. 5 | $10^{9-10}$ | −5 | −2 | −4 |
| Example 4 | $10^{15}$ or more | +12 | +10 | +10 |
| Com. Exam. 6 | $10^{12}$ | +3 | +1 | +2 |

EXAMPLE 5

Forty parts by weight of the domain resin and 5 parts by weight of carbon black was subjected to melting and kneading by a two-axis kneading and extruding machine.

A colored composition was obtained by melting and kneading 45 parts by weight of this kneaded material, 55 parts by weight of the matrix resin and 8 parts by weight of the dispersion assistant by a two-axis melting and kneading machine.

A portion of this colored composition was placed between a piece of slide glass and cover glass and was formed into a thin film by heating and melting on a hot-plate. The film was observed under a transmittance type optical microscope to find an existence of a colored dispersion phase with its particle size of 0.5 to 1.0 μm. This dispersed phase was finely and uniformly distributed over the matrix phase and any coloring agent was observed in the matrix phase at all.

The colored material was pulverized by a Cryptron crushing method and classified to give a toner with a particle size of 8 μm. The yield of classification was 85%.

COMPARATIVE EXAMPLE 7

A colored and kneaded composition was obtained by melting and kneading 40 parts by weight of the domain resin, 55 parts by weight of the matrix resin and 5 parts by weight of carbon black by a two-axis kneading and extruding machine.

When the composition was evaluated by the same method as used in Example 5, the coloring agent was distributed almost uniformly over the entire system and few dispersed phase was observed. The yield of classification was as low as 37% and the particle size distribution was broad.

The composition showed an Izod impact strength of 0.22 (kgf.cm/cm), which was a value close to that of the matrix resin.

EXAMPLE 6

A colored composition was obtained by the same method as used in Comparative Example 3, except that a dispersion assistant having an Izod impact strength of 0.6 (kgf.cm/cm) was used instead of the dispersion assistant used in Comparative Example 3.

When the composition was evaluated by the same method as used in Example 5, the dispersed phase was finely and uniformly distributed as was observed in Comparative Example 3, and any coloring agent was not found in the matrix phase.

A good classification yield of 79% was attained when the colored composition was subjected to a fine pulverizing and classifying by the same method as used in Example 5, though a longer pulverizing time than that in Comparative Example 3 was required.

EXAMPLE 7

A colored composition was obtained by the same method as used in Example 5, except that 60 parts by weight of the kneaded composition obtained by melting and kneading 40 parts by weight of the domain resin and 20 parts by weight of carbon black by a two-axis kneading and extruding machine was used.

When this composition was evaluated by the same method as used before, the dispersion state was found to be similar to that in Example 5. A classification yield of 85%, which was a similar value to that in Example 5, was obtained.

EXAMPLE 8

A kneaded material was prepared in a manner similar to Example 6, except that 20 parts by weight of carbon black was used.

A colored composition was obtained by melting and kneading 60 parts by weight of this kneaded material, parts by weight of the matrix resin and 8 parts by 55 weight of the dispersion assistant which was increased in the degree of polymerization to make its impact value to 0.6 (kgf.cm/cm).

When this composition was evaluated by the same method as used in Example 5, an existence of colored dispersion phase was observed with its particle size of 0.6 to 1.0 μm, and this dispersed phase was finely and uniformly distributed over the matrix resin. Any coloring agent was found in the matrix resin at all.

The colored composition was finely pulverized and classified by the same method as used in Example 5 to give a good classification yield of 81%, although a long time was required for classifying.

The results are listed in Table 2.

TABLE 2

| | Structure of the composition | Pulverizing method | Yield (%) |
|---|---|---|---|
| Example 5 | Dispersed phase | Low impact method | 85% |
| Example 6 | ↑ | ↑ | 79% |
| Example 7 | ↑ | ↑ | 85% |
| Example 8 | ↑ | ↑ | 81% |
| Comparative Example 7 | No dispersed phase | ↑ | 37% |

Table 2 shows that the yield was more improved compared with the method in Examples 1 to 4 by applying a low impact method.

When the particle size distribution of the toner was measured by a particle size distribution measuring apparatus of a laser diffraction type (made by Horiba. Ltd.), the toner in the examples clearly showed a sharper particle size distribution compared with that in the comparative examples.

As are apparent from the results described above, the use of a low impact pulverizing method improved the pulverizing and classifying yield as well as the particle size distribution.

Further, concrete examples are described below. In the following examples, domain resin is composed of polyesters and matrix resin is composed of copolymers of styrenes. Common monomer components between the domain resin and the matrix resin are not contained in Examples and Comparative Examples below.

Each number average molecular weight and Izod impact strength of the domain resin, the matrix resin and the dispersion assistant are shown in Table 3.

TABLE 3

| | Molecular Weight (Mn) | Izod Impact Strength (Kgf · cm/cm) |
|---|---|---|
| 1)Domain Resin Polyester resin | | |
| A | 5500 | 0.45 |
| B | 10000 | 0.60 |
| C | 7000 | 0.55 |
| D | 4000 | 0.38 |
| 2)Matrix Resin Styrene copolymers | | |
| A(reference Exam 6) | 15000 | 0.19 |
| B(reference Exam 7) | 32000 | 0.28 |
| C(reference Exam 8) | 14000 | 0.21 |
| 3)dispersion assistant modified polyester resin | | |
| A(reference Exam 2) | — | 0.56 |
| B(reference Exam 3) | — | 0.70 |
| C(reference Exam 4) | — | 0.35 |
| D(reference Exam 5) | — | 0.36 |

REFERENCE EXAMPLE 2 (Production of the Dispersion Assistant Resin)

An aqueous medium was prepared in an autoclave of net volume of 10 litters by adding 4 kg of water, 80 g of calcium phosphate tribasic and 0.12 g of sodium dodecylbenzene sulfonate. A solution prepared by dissolving 8 g of benzoylperoxide ("NYPER BW (trade mark)"; made by Nippon Oil & Fats Co. Ltd.) in a mixed solution of 640 g of styrene and 160 g of n-butyl acrylate was added to the aqueous medium followed by stirring. After placing 1200 g of polyester A for domain resin shown in Table 3 (amorphous, glass transition temperature of 65 ° C., molecular weight of about 5500) into the solution and replacing the interior of the autoclave with nitrogen, the temperature inside the reaction system was raised to 60° C. and, while keeping the temperature for 3 hours, the matrix resin particles were impregnated with styrene containing the polymerization initiator described above.

Then, 11.4 g of t-butyl peroxypivarate "PERBUTYL PV (trade mark)" was placed into this suspension and, after raising the system temperature to 65° C. and keeping the temperature for 2 hours, polymerization of the surface of the polyester particles was allowed to start. Polymerization was completed by raising the temperature of the reaction system to 90° C. and keeping the temperature for 3 hours.

After cooling, the substance in the reaction system was taken out and was subjected to washing with acid and water, thereby giving 2 kg of the dispersion assistant resin A.

REFERENCE EXAMPLE 3 (Production of the Dispersion Assistant Resin)

Dispersion assistant B of 2 kg was prepared in a manner similar to Reference Example 2 except that polyester B for domain resin shown in Table 3 (amorphous, glass transition temperature of 72° C., molecular weight of about 10000) was used.

REFERENCE EXAMPLE 4 (Production of the Dispersion Assistant Resin)

Dispersion assistant C of 2 kg was prepared in a manner similar to Reference Example 2 except that polyester C for domain resin shown in Table 3 (amorphous, glass transition temperature of 51° C., molecular weight of about 3000) was used.

REFERENCE EXAMPLE 5 (Production of the Dispersion Assistant Resin)

Dispersion assistant D of 2 kg was prepared in a manner similar to Reference Example 2 except that polyester D for domain resin shown in Table 3 (amorphous, glass transition temperature of 62° C., molecular weight of about 4000) was used, only styrene of 800 g was used as vinyl monomer, and "NYPER BW" of 9.6 g and "PERBUTYL PV" of 13.7 g were used as an initiator.

REFERENCE EXAMPLE 6 (Production of Styrene Copolymer)

An aqueous medium was prepared in an autoclave of net volume of 10 litters by adding 4 kg of water, 80 g of calcium phosphate tribasic and 0.12 g of sodium dodecylbenzene sulfonate, and a solution prepared by dissolving 28.6 g of PERBUTYL PV and 20 g of "NYPER B" in a mixed solution of 1.4 kg of styrene and 600 g of n-butyl methacrylate was added to the aqueous medium followed by stirring.

After replacing the interior of the autoclave with nitrogen, the temperature inside the reaction system was raised to 65° C. and, while keeping the temperature for 3 hours. Then polymerization was completed by raising the temperature of the reaction system to 90° C. and keeping the temperature for 2 hours.

After cooling, the substance in the reaction system was taken out and was subjected to washing with acid and water, thereby giving 2 kg of copolymer resin A of styrenes.

The copolymer A was subjected to quantitative analysis by means of infrared spectrum. The copolymer contained styrene of 70 percents by weight and n-butylmethacrylate of 30 percents by weight. It is understood that the reaction was carried out almost quantitatively.

REFERENCE EXAMPLE 7 (Production of Copolymer of Polystyrene)

Polystyrene B of 2 kg was prepared in a manner similar to Reference Example 6 except that "PERBUTYL PV" of 23 g and "NYPER BW" of 16 g were used as an initiator.

REFERENCE EXAMPLE 8 (Production of Copolymer of Polystyrene)

Copolymer of polystyrene C of 2 kg was prepared in a manner similar to Reference Example 6 except that styrene of 1.4 kg, n-butyl methacrylate of 580 g and methacrylic acid of 20 g were used as monomers.

EXAMPLE 9

Thirty five parts by weight of the domain resin A and 5 parts by weight of carbon black were melted and kneaded by a two-axis kneading and extruding machine.

A colored composition was obtained by melting and kneading 40 parts by weight of this kneaded material, 50 parts by weight of the matrix resin A and 10 parts by weight of the dispersion assistant by using a two-axis kneading and extruding machine.

A portion of this colored composition was placed between a piece of slide glass and cover glass and a thin film was formed by heating and melting on a hot plate, and the sample was investigated by a transmission type optical microscope. An existence of colored dispersion phase was observed and its particles size was found to be 0.5 to 1.0 μm, which indicated that the dispersed phase was finely and uniformly distributed in the matrix. Any coloring agent was not observed in the matrix resin.

The colored material was finely pulverized by means of Cryptron crushing method and classified. The distribution of particle size was measured by means of a distribution-measuring apparatus of laser diffraction type (made by Horiba. Ltd.) to measure mean particle size. Further, the yield of classification was compared. The results of Examples including this Example are summarized in Table 4.

EXAMPLE 10

Seven parts by weight of Carbon black and 30 parts by weight of the domain resin B were melted and kneaded. A colored composition was obtained by melting and kneading 37 parts by weight of this kneaded material, 55 parts by weight of the matrix resin B and 8 parts by weight of the dispersion assistant B.

The obtained composition was evaluated in a manner similar to Example 9. Colored domain resin phases were observed. The phase sizes were 0.5–1.0 μm. The domain phases were dispersed uniformly in the matrix resin. The coloring agent was not observed in the matrix resin phases.

EXAMPLE 11

A colored composition was prepared in a manner similar to Example 10, except that the domain resin C (amorphous, 67° C. in glass transition point, 7000 in molecular weight) was used as a domain resin, the matrix resin A was used as a matrix resin and the dispersion assistant B was used as a dispersion assistant.

Dispersion states of the domain resin were as same as those of Example 10.

EXAMPLE 12

A colored composition was prepared in a manner similar to Example 11, except that Rhodamine B Base (C.I. Solvent Red 49) was used as a coloring agent. It was observed that colored domain resin was dispersed finely and similarly to Example 11 and the coloring agent was not observed in matrix resin phases.

EXAMPLE 13

A colored composition was prepared in a manner similar to Example 9, except that the dispersion assistant C was used as a dispersion assistant to be evaluated. It was observed that colored domain resin was dispersed finely and similarly to Example 9 and the coloring agent was not observed in matrix resin phases.

EXAMPLE 14

A colored composition was prepared in a manner similar to Example 9, except that the domain resin D was used as a domain resin and the dispersion assistant D was used as a dispersion assistant.

There was no problem in practical use although the domain resin particles were a little big and nonuniform compared with those of Example 9.

EXAMPLE 15

Thirty parts by weight of the domain resin A and 7 parts by weight of carbon black were melted and kneaded. A colored composition was obtained by melting and kneading 37 parts by weight of this kneaded material, 8 parts by weight of the dispersion assistant A and 55 parts by weight of the matrix resin B.

The colored composition was pulverized and classified to give toner particles having mean particle size of 11.7 μm.

EXAMPLE 16

Thirty parts by weight of the domain resin D and 7 parts by weight of carbon black were melted and kneaded at 140° C. in a two axial extruder.

Thirty five of this kneaded material, 55 parts by weight of the matrix resin C and 8 parts by weight of the dispersion assistant C were melted and kneaded at 140° C. to give a coloring composition.

The coloring composition was observed in a manner similar to Example 9. It was observed that domain resin phases filled with the coloring agent were dispersed uniformly. The domain resin phases had mean particle size of 2.5 μm.

COMPARATIVE EXAMPLE 8

A coloring composition was prepared in a manner similar to Example 9 except that the dispersion assistant was not used. The obtained composition was observed. The dispersion of domain resin phases was observed. The particle size of the phases, however, were big and nonuniform.

EXAMPLE 17

A coloring composition was obtained in a manner similar to Example 9 except for exchanging the matrix resin and domain resin used in Example 9 with each other, i.e. the styrene.acrylate copolymer A was used as a domain resin and the polyester resin A was used as a matrix resin.

Dispersion particle size of domain resin phases in this composition was nonuniform compared with that of Example 9.

The toner compositions obtained in above Examples and Comparative Examples are summarized in Table 4 together with Izod impact strength.

TABLE 4

| | Toner composition/strength (Kgf · cm/cm) | | | mean particle | classi-fication |
|---|---|---|---|---|---|
| | Dispersion Assistant | Domain Resin | Matrix Resin | size (μm) | yield (%) |
| Example 9 | A/0.56 | A/0.45 | A/0.19 | 8.1 | 82 |
| Example 10 | B/0.70 | B/0.60 | B/0.28 | 8.5 | 80 |
| Example 11 | B/0.70 | C/0.55 | A/0.19 | 7.5 | 85 |
| Example 12 | B/0.70 | C/0.55 | A/0.19 | 7.4 | 85 |
| Example 13 | C/0.35 | A/0.45 | A/0.19 | 8.0 | 70 |
| Example 14 | D/0.36 | D/0.38 | A/0.19 | 7.8 | 72 |
| Example 15 | A/0.56 | A/0.45 | B/0.28 | 11.7 | 80 |
| Example 16 | C/0.35 | D/0.38 | C/0.21 | 7.9 | 71 |
| Com. Ex. 8 | — | A/0.45 | A/0.19 | 7.2 | 51 |
| Example 17 | A/0.56 | A/0.19 (Matrix A) | A/0.45 (Domain A) | 7.5 | 70 |

Electrification amounts and distribution thereof with respect to toners obtained in examples 9-11, 13, 14, 16, 17 and Comparative Example 8 were measured by a blow-off charge-measuring apparatus. The electrification amounts were measured after each toner was left under conditions of high temperature (30° C.) and high humidity (85%) for 12 hours and under conditions of 45° C. for 30 days. The measured amounts were compared with initial electrification amounts (measured after contacted with carrier for 1 hour). The results were summarized in Table 5.

The toners prepared by Examples exhibited that distribution of electrification amounts was sharp compared with that of Comparative Example. The ratio of toner particles which were low charged and oppositely charged was small. Toner particles of Comparative Example 8 exhibited large distribution. The ratio of toner particles charged oppositely was high. The toner prepared in Examples were excellent in environmental stability and exhibit low change in electrification amount. To the contrary, the electrification amount of toner prepared in Comparative Example diminished much.

TABLE 5

| | Electrification amount (μC/g) | | |
|---|---|---|---|
| | initial amount | 30° C.-85% standing for 12 hr | 45° C. standing for 30 days |
| Example 9 | −23 | −23 | −22 |
| Example 10 | −24 | −23 | −23 |
| Example 11 | −25 | −25 | −24 |
| Example 13 | −23 | −22 | −22 |
| Com. Exam. 8 | −13 | −9 | −7 |

What is claimed is:

1. A toner for electrophotography comprising at least;

a domain resin composition containing a coloring agent;

a matrix resin composition having a low compatibility with the domain resin; and a dispersion assistant having a compatibility with both the domain resin and the matrix resin and having an Izod impact value higher than that of the matrix resin, the domain resin composition being dispersed in the matrix resin with the dispersion assistant interposed.

2. A method for producing a toner for electrophotography comprising the steps of:

(a) obtaining a kneaded material which is prepared by melting and kneading a domain resin with a coloring agent;

(b) obtaining a colored composition by melting and kneading the kneaded material obtained in step (a), a matrix resin having a low compatibility with the domain resin, and a dispersion assistant having a compatibility with both the domain resin and the matrix resin and an Izod impact value higher than that of the matrix resin; and (c) pulverizing and classifying the kneaded material obtained in step (b).

3. A toner of claim 1, wherein all the amount of the coloring agent is substantially incorporated in the domain resin phase and the dispersion assistant phase.

4. A toner of claim 1, wherein the domain resin is composed of a polyester having number-average molecular weight of 500–30000.

5. A toner of claim 1, wherein the matrix resin is a copolymer composed of 50 percents by weight or more of styrenes and 50 percents by weight or less of an unsaturated carboxylic monomer or a derivative thereof.

6. A toner for electrophotography comprising at least;

a matrix resin phase;

a domain resin phase containing a coloring agent and being dispersed in the matrix resin phase, and the domain resin having a low compatibility with the matrix resin; and a dispersion assistant having a compatibility with both the domain resin and the matrix resin, and existing between the domain resin phase and the matrix resin phase, the relationship among Izod impact values of the domain resin, the matrix resin and the dispersion assistant being as below:

(dispersion assistant)≧(domain resin)>(matrix resin);

and the toner having a mean particle size of less than 10μm.

7. A toner of claim 6, wherein the domain resin is composed of a thermoplastic polyester, the matrix resin is composed of a thermoplastic polystyrene and the dispersion assistant is composed of a thermoplastic resin.

8. A toner of claim 6, wherein the dispersion assistant is composed of a modified polyester obtained by modifying chemically a thermoplastic polyester having number-average molecular weight equal to or more than that of the polyester of the domain resin by use of styrenes or a mixture of styrenes with unsaturated carboxylic acids or derivatives thereof.

9. A toner of claim 6, containing carbon black as a coloring agent.

10. A toner of claim 9, all the amount of the coloring agent is substantially incorporated in the domain resin phase and the dispersion assistant phase.

11. A method for producing a toner having a small particle size for electrophotography comprising the steps of:

(a) obtaining a kneaded material which is prepared by melting and kneading a domain resin with a coloring agent;

(b) obtaining a colored composition by melting and kneading the kneaded material obtained in step (a), a matrix resin having a low compatibility with the domain resin, and a dispersion assistant having a compatibility with both the domain resin and the matrix resin, the relationship among Izod impact values of the domain resin, the matrix resin and the dispersion assistant being as below:

(dispersion assistant)≧(domain resin)>(matrix resin), (c) pulverizing and classifying the kneaded material obtained in step (b), thereby obtaining the toner having a mean particle size of less than 10 μm.

12. A method of claim 11, wherein the domain resin is composed of a thermoplastic polyester, the matrix resin is composed of a thermoplastic polystyrene and the dispersion assistant is composed of a thermoplastic resin.

13. A toner of claim 1, wherein the Izod impact value of the dispersion assistant if 0.1 kgf.cm/cm higher or more than that of the matrix resin.

14. A toner of claim 6, wherein the Izod impact value of the dispersion assistant if 0.1 kgf.cm/cm higher or more than that of the domain resin.

15. A toner of claim 6, wherein the Izod impact value of the dispersion assistant is 0.2 kgf.cm/cm higher or more than that of the matrix resin.

16. A toner of claim 1, wherein the matrix resin composition has an Izod impact value lower than that of the domain resin.

17. A method of claim 2, wherein the matrix resin composition has an Izod impact value lower than that of the domain resin.

* * * * *